No. 771,401. PATENTED OCT. 4, 1904.
W. S. VAN AMBERG.
GROOVING SAW.
APPLICATION FILED FEB. 16, 1904.
NO MODEL.
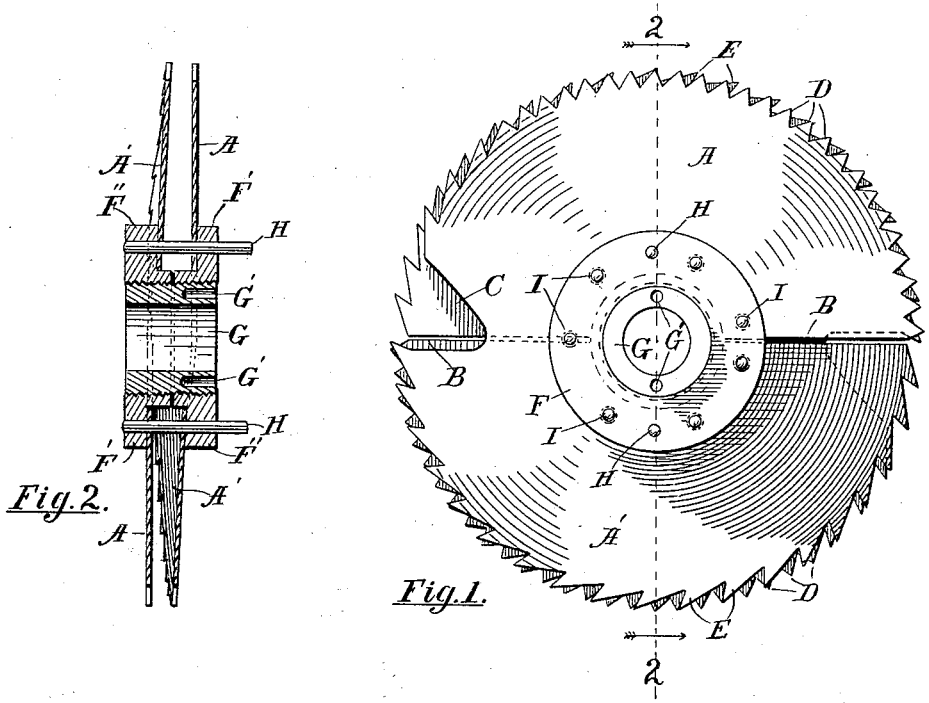
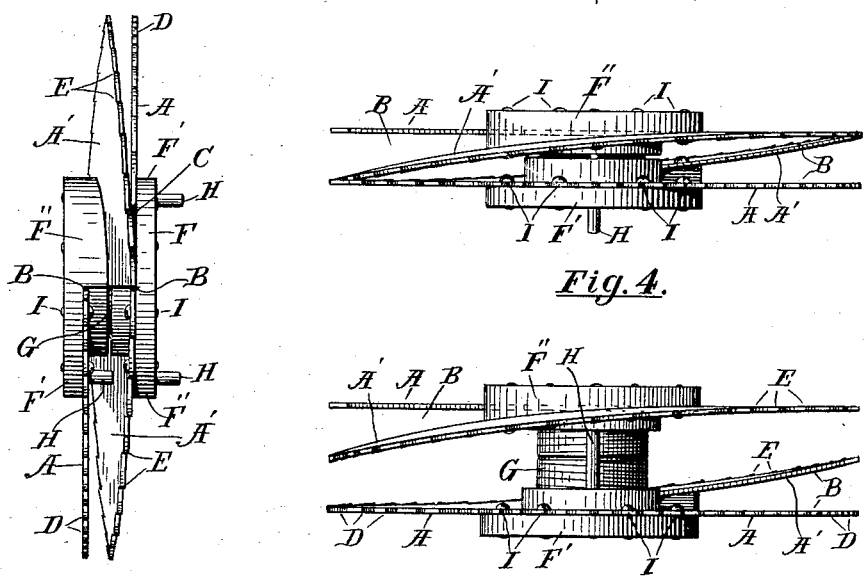
Witnesses
Georgiana Chace
Palmer A. Jones
Inventor
William S. Van Amberg
By Luther V. Moulton
Attorney No. 771,401.

Patented October 4, 1904.

UNITED STATES PATENT OFFICE.

WILLIAM S. VAN AMBERG, OF GRAND RAPIDS, MICHIGAN.

GROOVING-SAW.

SPECIFICATION forming part of Letters Patent No. 771,401, dated October 4, 1904.

Application filed February 16, 1904. Serial No. 193,819. (No model.)

*To all whom it may concern:*

Be it known that I, WILLIAM S. VAN AMBERG, a citizen of the United States, residing at Grand Rapids, in the county of Kent and State of Michigan, have invented certain new and useful Improvements in Grooving-Saws; and I do hereby declare the following to be a full, clear, and exact description of the invention, such as will enable others skilled in the art to which it appertains to make and use the same.

My invention relates to improvements in grooving-saws; and its object is to provide the same with certain new and useful features hereinafter more fully described, and particularly pointed out in the claims.

My invention consists, essentially, of the combination and arrangement of a pair of circular saws, each saw being divided radially and attached to collars, each collar being provided with a portion of its side in a plane at right angles to its axis, and the remainder of said side spirally inclined to the axis, whereby a portion of the saw is held in a plane at right angles to its axis and the remaining portion of the saw is sprung or bent laterally toward the other saw, and a sleeve and guide-pins connecting said collars to adjust the same relative to each other to determine the width of the groove cut by the device, as will hereinafter more fully appear by reference to the accompanying drawings, in which—

Figure 1 is a side elevation of a device embodying my invention; Fig. 2, a vertical section of the same on the line 2 2 of Fig. 1; Fig. 3, an elevation at right angles to Fig. 2; Fig. 4, a plan view of Fig. 2, showing the device adjusted for a narrow groove; and Fig. 5, the same adjusted for a wide groove.

Like letters refer to like parts in all of the figures.

The saws A A' are each substantially circular, and each saw is divided radially at one side of the axis, as indicated at B, and at the other side is provided with a recess C in its edge to receive the angle of the adjacent saw when the device is adjusted for a narrow groove. The part A of each saw is provided with cut-off teeth D and is adjusted, substantially, in a plane at right angles to the axis, whereby it is adapted to cut a smooth wall to the groove. The part A' of each saw is sprung or curved laterally toward the other saw and preferably provided with rip-saw teeth E for the purpose of removing the material of the lumber between the walls of the groove. To retain the saw in this form and mount the same on the arbor, a suitable collar F is provided, to which the saw is attached by means of suitable fastenings I. The portion F' of this collar opposite the part A of the saw presents a surface to the saw arranged in a plane at right angles to the axis of the saw and collar. The portion of the collar F'' opposite the part of the saw A' is provided with a surface to engage the same arranged inclined or spiral to the axis of the saw, whereby the saw is sprung laterally toward the other saw, as shown.

The laterally-projecting angle of the part A' of each saw is arranged opposite the recess C in the other saw, and when the collars are in close relation to each other the said angle projects within the recess, and the saw is thus adjusted to the narrowest groove that the device will cut. To adjust these collars toward and from each other and to maintain them in proper relation, guide-pins H are provided fixed in one collar and longitudinally movable in openings in the other collar, and in the central openings of these collars is a right and left screw-threaded sleeve G, engaging suitable threads in the collars and provided with openings G', in which a suitable tool is inserted to rotate the sleeve within the collars. Thus by turning the sleeve the collars are adjusted toward and from each other, as indicated in Figs. 4 and 5, and when adjusted as in Fig. 4 the narrowest groove possible is cut, and when adjusted as in Fig. 5 the groove will be of double the width of the groove cut when adjusted as in Fig. 4, and any width between these two extremes may be cut by this device by merely rotating the sleeve G and thus adjusting the saws toward and from each other.

I have shown saws each divided substantially into two equal parts, one arranged in a plane at right angles to the axis and the other part arranged spiral to the axis; but it is obvious that these parts may be unequal without departing from the invention.

Having thus fully described my invention, what I claim, and desire to secure by Letters Patent, is—

1. In a grooving-saw, a substantially circular saw divided radially at one side of its axis, and having one part in a plane at right angles to its axis and the remainder arranged spirally to the said axis, means for retaining the saw in the described form, and means for mounting the same upon an arbor.

2. In a grooving-saw, a saw divided radially at one side of its axis and a collar attached to said saw and having a portion engaging the saw in a plane at right angles to its axis and another portion engaging the saw spirally to said axis.

3. In a grooving-saw, two circular saws each divided radially at one side of the axis and arranged opposite to each other, a portion of each saw being arranged in parallel planes and at right angles to the axis of the saws, and the remaining portion of each saw being inclined toward the other saw, and collars engaging said saws to hold the same in position.

4. In a grooving-saw, two substantially circular saws arranged opposite to each other, each saw being divided radially at one side of its axis and adjusted opposite to the other saw, a recess in the edge of each saw opposite the division of the other saw, and collars respectively engaging the saws, each collar having a portion of its surface in a plane at right angles to its axis, and the remaining portion of each collar being arranged spirally to its axis, means for attaching the saws to the collars, and means for adjusting the collars toward and from each other.

5. In a grooving-saw, the combination of two circular saws, each divided radially at one side of its axis and each having a portion provided with cut-off teeth and a portion provided with rip-saw teeth, collars respectively engaging the saws and having surfaces in planes at right angles to the axis to engage the portions of the saws having the cut-off teeth, and other portions having surfaces spiral to the axis and engaging the portions of the saws having the rip-saw teeth, and means for adjusting the collars and saws toward and from each other.

6. In a grooving-saw, the combination of a rotative sleeve having right and left hand screw-threads, two collars mounted on the sleeve, each collar having a portion of its surface in the plane at right angles to the axis of the sleeve, and another portion of its surface arranged spiral to the axis of the sleeve, pins adjustably connecting said collars, circular saws attached to the described surfaces of said collars, each saw being radially divided at one side and provided with rip-saw teeth throughout a part of the circumference, and cut-off teeth throughout another part of its circumference.

In testimony whereof I affix my signature in presence of two witnesses.

WILLIAM S. VAN AMBERG.

Witnesses:
LUTHER V. MOULTON,
GEORGIANA CHACE.